United States Patent
Hallstrom

(10) Patent No.: US 6,213,320 B1
(45) Date of Patent: Apr. 10, 2001

(54) ENHANCED EFFICIENCY METHOD OF LOGGING AND SPECIALIZED APPARATUS THEREFOR

(76) Inventor: Richard A Hallstrom, 333 Fairmont Rd., Kalispell, MT (US) 59903

( * ) Notice: Subject to any disclaimer, the term of this patent is extended or adjusted under 35 U.S.C. 154(b) by 0 days.

(21) Appl. No.: 09/503,863

(22) Filed: Feb. 14, 2000

(51) Int. Cl.[7] .................................................. B27M 1/08
(52) U.S. Cl. ............................. 212/270; 144/3.1; 212/76; 212/294
(58) Field of Search ............................. 212/71, 76–123, 212/270, 294; 144/3.1

(56) References Cited

U.S. PATENT DOCUMENTS

| | | | | |
|---|---|---|---|---|
| 2,694,474 | * | 11/1954 | Meany | 212/301 |
| 2,734,641 | * | 2/1956 | Burton | 212/7 |
| 2,883,068 | * | 4/1959 | McIntyre | 212/239 |
| 3,269,559 | * | 8/1966 | Shroyer | 212/7 |
| 3,627,351 | * | 12/1971 | Zimmerman et al. | 280/179 R |
| 3,733,786 | * | 5/1973 | Vit | 144/2 Z |
| 4,400,132 | * | 8/1983 | Deline et al. | 414/569 |
| 5,957,177 | * | 9/1999 | Smith et al. | 144/248.7 |

FOREIGN PATENT DOCUMENTS 8-246488 * 7/1995 (JP).

* cited by examiner

Primary Examiner—Thomas J. Brahan
(74) Attorney, Agent, or Firm—Olson & Olson

(57) ABSTRACT

A method of logging utilizes a combination log yarder and processor vehicle having a basic vehicle structure not unlike that of a track-type excavating machine, but with a boom arm assembly arranged for operation in conjunction with a log processing head apparatus and its particular requirements for the handling and processing of felled logs and trees. The vehicle mounts a collapsible yarder tower arrangement which rotatably mounts a cable guide head member for relative rotation between the cable guide head and the vehicle on the same center axis of rotation as the vehicle turntable rotates on its undercarriage, thereby permitting the vehicle full rotational capabilities and operation of its boom arm apparatus when the yarder apparatus' cables are extended and anchored and in operation, and thereby permits a yarding operation of felled trees to be conducted simultaneously with a log processing, log sorting and log loading operation by a single personnel at a destination location at a logging site.

2 Claims, 3 Drawing Sheets

ENHANCED EFFICIENCY METHOD OF LOGGING AND SPECIALIZED APPARATUS THEREFOR

BACKGROUND OF THE INVENTION

This invention relates to the logging industry, and in particular to a novel logging method and vehicle arranged to accomplish, at a logging job site, the yarding of felled trees, the processing of the yarded trees into logs, and the loading or sorting of the processed logs, as a concurrent operation conducted by a single operator and vehicle. In the logging industry it is often necessary, particularly on steep terrain or on sensitive soils, etc., to move trees from low-lying areas where they have been felled to a remote location that is accessible by vehicles and heavy equipment necessary to handle, process and load the logs onto log trucks for transportation to a mill or other end destination. Typically the most cost-effective and common method of moving the logs or felled trees is by log yarders or towers disposed at the destination location with cables extending therefrom to a tree cutting location, often a significant distance away. A log-engaging and transporting carriage assembly is supported on the cable assembly for movement from one end to the other and back, the carriage being moved therebetween by a winch line connected to the carriage and paid in or out from the tower as is well known in the trade. The tower is secured against tipping under the weight and tension of the long cables and the carriage and its load by guy lines which extend from the top of the tower to secure anchor points as needed. These tower yarder arrangements have already been provided in collapsible form and mounted on dedicated vehicles to facilitate their movement and set up in the field. As for example in U.S. Pat. No. 2,720,986 (Burton); U.S. Pat. No. 2,883,068 (McIntyre), U.S. Pat. No. 2,784,850 (Batson et al) and U.S. Pat. No. 3,083,839 (McIntyre).

In operation, a felled tree or log is picked up by the carriage and supported thereby above the ground as the carriage is pulled by a winch line along the carriage supporting cable to its off-loading site where the tree or log is dropped and the operator of the yarder returns the carriage back to its loading site to pick up another load. Typically, after a load has been delivered to the drop off site by the yarder, a second specialized vehicle which is equipped to pick up and carry logs is operated by another skilled worker to move the delivered trees or logs from the drop off site to another location adjacent a log processing vehicle which comprises another dedicated, specialized piece of equipment and its skilled operator. Vehicle-mounted log processor heads are known in the art, as illustrated by those provided by Denharco, Hyundai and Keto to name a few.

These processor vehicles typically mount the log processor head on the end of an articulated boom, and are configured to receive a log and effectively de-limb it, size it, and cut it to desired transportable, merchantable lengths, after which the processed log is then typically picked up by yet another vehicle and either loaded onto log trucks or the like for transport or placed into sorting stacks to await loading onto a transport vehicle.

As is readily apparent, typical logging procedures in such circumstances commonly require four separate, specialized, dedicated pieces of heavy equipment and four skilled operators and multiple handlings of each log or tree and resulting in a time consuming and inefficient and very expensive process. It is therefore seen that the industry would benefit from a logging method and vehicle by which a single operator can effectively and efficiently accomplish a number of separate logging operations simultaneously and thereby eliminate the individual handlings of each tree or log by the separately operated, individual pieces of equipment that are currently required.

SUMMARY OF THE INVENTION

In its basic concept, this invention provides a method of logging by which a single, mobile vehicle is especially configured to mount a log yarder tower and a log processing head apparatus so combined to permit a single operator to perform the log yarding operation while also simultaneously operating the vehicle and log processing mechanism during the yarding operation to process logs previously delivered by the yarder and then move each processed log into a selected position adjacent the vehicle onto a log truck or into selected, sorted stacks, etc.

It is by virtue of the foregoing basic concept that the principal objective of this invention is achieved; namely, the provision of a new logging method that eliminates the need for multiple pieces of dedicated, specialized heavy equipment and associated individual operators, and the extremely high purchase and operating costs that they entail, and which is also particularly advantageous and well-suited to thinning operations where impact on the ecology of the affected area should be kept to a minimum.

Another object of this invention is the provision of a logging vehicle of the class described which itself is self propelled, fully mobile and trailerable.

Another object of this invention is the provision of a combination log yarding and processing vehicle of the class described which includes a collapsible tower configuration for ease of vehicle movement about a work area and highway trailerability for transportation of the vehicle from job-site-to-job-site.

A further object of this invention is the provision of a combination log yarding and processing vehicle which is of as simplified construction as possible for economical manufacture and reliability in operation.

These and other objects and advantages of the present invention will appear from the following detailed description, taken in connection with the accompanying drawings of a preferred embodiment.

DESCRIPTION OF THE PREFERRED EMBODIMENT

Figure 1:
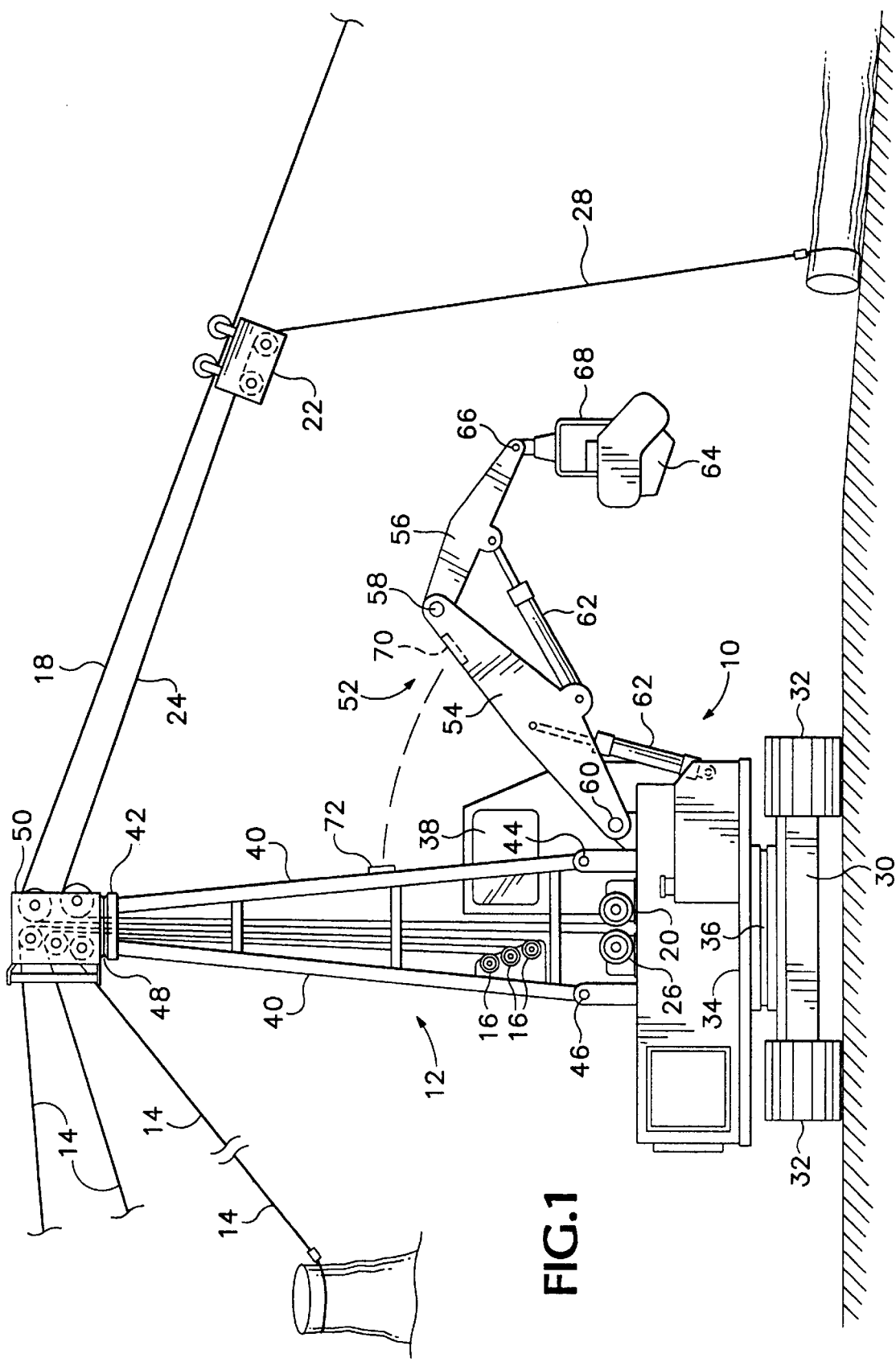
FIG. 1 is a fragmentary, foreshortened side elevation of the vehicle of this invention set up at a logging work site with its yarder tower in erected condition and tied back to secure guide line anchor holds and operatively supporting the yarder carriage apparatus and cables.
Figure 2:
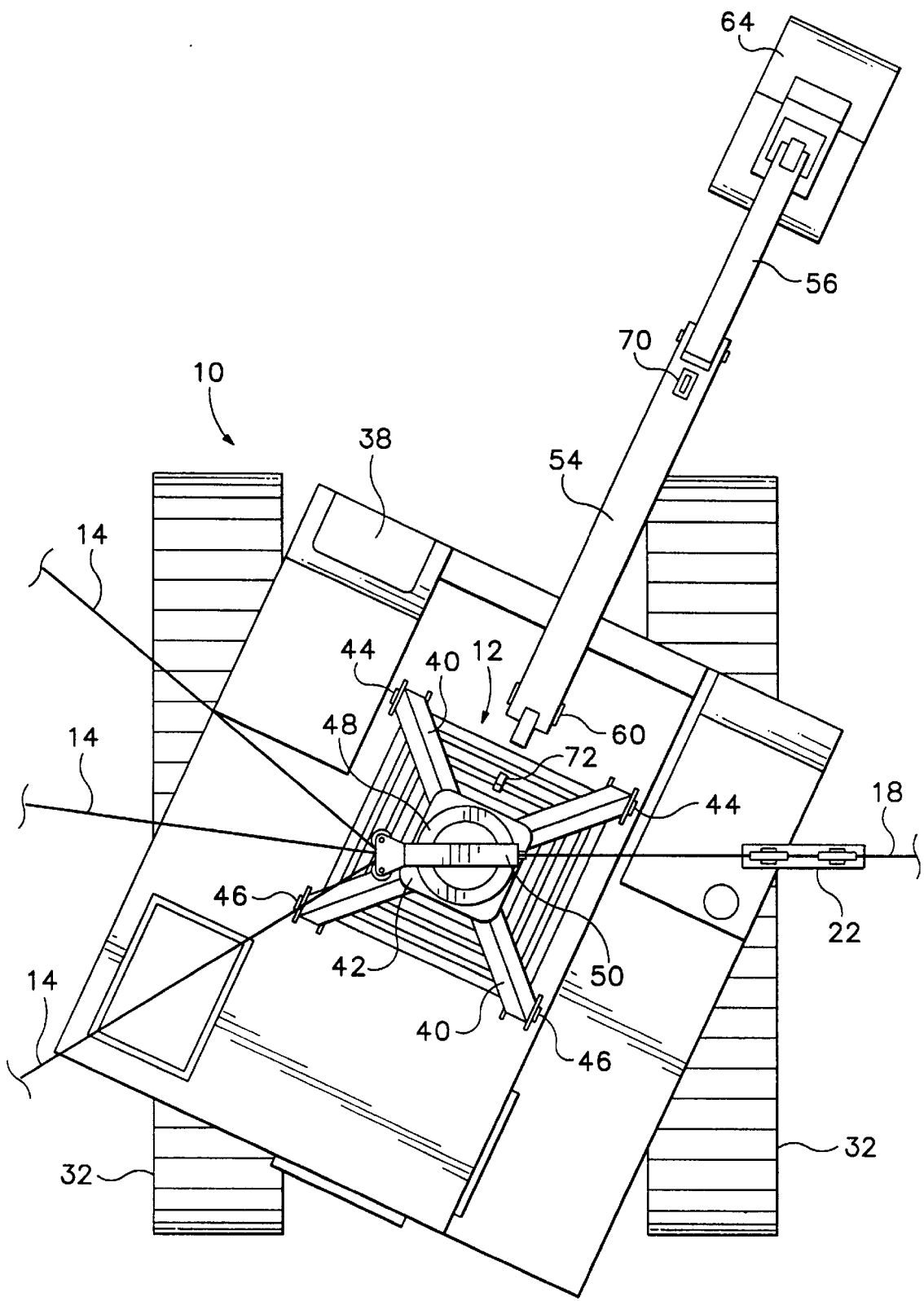
FIG. 2 is a plan view of the vehicle of this invention as viewed from the top in FIG. 2.

FIG. 1 of the drawings well illustrates the basic concept of the method and vehicle of this invention and the set up, operative condition of the vehicle, which will become clear from the following.

As a general overview, FIG. 1 shows the vehicle of this invention, identified generally at 10, positioned for operation at a logging work site and mounting, in part, an upstanding yarder tower assembly indicated generally at 12. As those skilled in the logging industry well recognize, tie back lines or guy lines 14 are paid out from the top of the tower, as by hydraulic winches 16, and anchored to suitable guy line holds such as trees, stumps, etc. for the purpose of stabilizing the yarder during operation and obviously to prevent the yarder and tower from tipping during operation. Extending from the top of the tower in the opposite direction of the stabilizing guy lines is the yarder skyline 18 which is carried by winch 26 mounted on the vehicle and paid out sufficiently to be anchored at its terminal end to a suitable tail hold at a desired tree felling location (not shown), often 1500 ft or more distant and typically angled downward because of the steep terrain common to such logging areas. Movement of a log carriage 22 along the skyline 18 is effected by main line 24 carried on winch 20 and connected at its terminal end to the log carriage so that operation of the winch 20 in one direction or the other moves the carriage in one direction or the other as is obvious.

The operation of a log yarder is very basic: With the carriage positioned at the tree felling location, a load of logs or trees is secured to choker 28 and the operator of the yarder then activates winch 20 to wind the main line 24, pulling the carriage and its suspended load along the skyline 18 to an off-loading site adjacent the yarder, where the load of trees or logs is dropped and freed of the choker 28. The operator of the yarder then simply reverses the operation of the winch to pay out the main line cable 24 and thereby allow the log carriage 22 to return down the skyline to the felling location to pick up another load.

As is readily apparent, the actual working operation of a conventional yarder apparatus simply entails the activation of a winch 20 in one direction or the other, while the rest of the time the operator is simply waiting while a load is being connected and disconnected and while the carriage is traversing the distance between loading and off loading sites. It is not at all difficult to appreciate how wasteful the foregoing operation is of the time and cost of the skilled heavy equipment operator in this process, and how desirable it would be to utilize his time more efficiently and cost effectively. It is therefore toward these goals that the present invention has been devised and which unique method and vehicle is now described in specific detail.

The combination log yarder and processor vehicle of this invention comprises a vehicle body 10 not unlike that of a turntable-type, heavy excavating machine. In this, the vehicle comprises a lower, supporting undercarriage assembly that is configured with ground engaging tracks 32, in the embodiment shown, for mobility and maneuverability about a ground surface, and an upper vehicle frame 34 mounted on the lower undercarriage assembly 30 through a powered turntable 36 as is well known in conventional vehicles of this general type in which the upper vehicle sections are provided for full rotation on their lower undercarriages about a vertical axis extending therebetween. As is also conventional, the vehicle includes an engine (not shown) which provides for the operation of all the electrically and hydraulically driven elements of the vehicle including its self-propelled mobility, as is well known. The top frame also mounts a typical operator's cab 38 which contains all of the operating controls for a single operator of the vehicle.

As shown clearly in the drawings, the upper vehicle frame 34 mounts a tower assembly 12 illustrated in this embodiment as comprising a framework of tower frame members 40 rigidly joined at their top ends to a tower top cap member 42 and at their bottom ends to vehicle frame mounts 44, 46 on the upper vehicle frame 34. As is apparent from viewing FIGS. 1 and 3 of the drawings, the tower frame mounts 44 are pivot mounts and the mounts 46 are releasably lockable mounts whereby to provide for the pivoting of the tower into a collapsed, storage condition (FIG. 3), as well as for the secure locking of the tower in an operative, upstanding condition (FIG. 1) for use.

As is apparent from the drawings, tower top cap 42 includes a central opening therethrough for the passage of cables 14, 18 and 24, and mounts a tower bearing ring assembly 48 which in turn mounts cable guide head 50 for relative rotation of the guide head and the supporting tower assembly. It is here important to note that in the configuration of the aforementioned tower assembly and its mount on the vehicle 10, it is preferable that the center point of the axis of rotation of the bearing ring 48 and the cable guide head 50 is disposed substantially on the same vertical line extending through the center point of the axis of rotation of the vehicle turntable 36 when the tower is locked in operative, erected condition, so that when the yarder cables 14 and 18 are extended and anchored for operation of the yarder, the tower and the vehicle below the guide head are free to rotate a full 360° on the vehicle turntable 36. With the yarder vehicle thus provided for unhindered rotation beneath the operatively anchored and tensioned skyline and tie back lines, the vehicle of this invention and its operator are thus afforded complete rotational maneuverability and access to the surrounding areas about the entire periphery of the machine as is reachable by the boom arm and processor head assemblies now to be described.

Accordingly, the vehicle of this invention further includes, again not unlike that of a turntable-type excavating machine, an articulated, hydraulically operated boom arm assembly identified generally at 52, of a type and mechanical configuration selected to provide for most advantageous maneuverability for the handling of trees and logs as will be described. Examples of acceptable boom arm types include, but are not necessarily limited to, the logging stick boom shown or, if desired for additional reach, a telescopic squirt boom, as well as other conventional types known in operations outside of the logging industry. As will be understood, these boom assemblies comprise two or more arm assemblies 54, 56 pivotally connected 58 for relative articulation and mounted on the supporting vehicle by pivot mount 60 for articulation thereon. Hydraulic cylinders 62 control each arm assembly's various pivotal, articulation movements as is well known in the art. In the present invention, the outermost terminal end of the hydraulically articulating boom assembly mounts a log processor head apparatus 64 preferably through a hydraulically controlled, articulated coupling 66 and tilt frame assembly 68 arranged to provide full, controllable maneuverability of the processor head to orient it as needed for its operation of engaging, moving processing and desired dispensing of logs and trees. These complex processor head assemblies and their processing operation are well known in the art, and therefore a detailed description of their construction and log processing operation is not necessary to the present disclosure.

Figure 3:
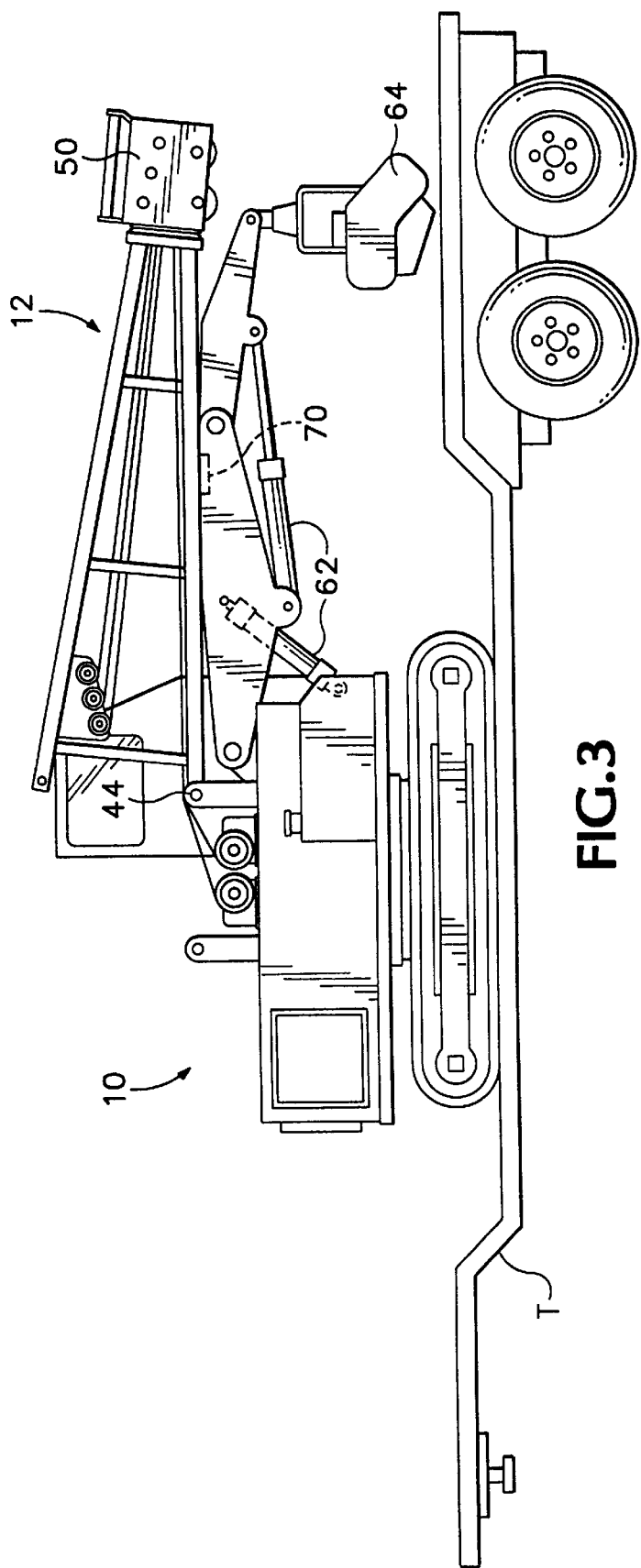
FIG. 3 is a side elevation of the vehicle of this invention in collapsed, transport condition on a low-bed truck trailer.

The method of logging of this invention is described in the explanation of the set up and operation of the combination log yarder and processor vehicle of this invention, which is as follows:

The vehicle is transported, as seen in FIG. 3, in its collapsed, transport condition on a low bed truck trailer T to the area of a logging work site and the operator then drives the vehicle to the location at which it is to be set up for operation. The tower 12, supported on and locked, by locking couplers 70, 72, to the lowered boom arm 52, is then pivoted, by operation of the boom arm, into its operative, upstanding position and locked in place by lock mounts 46. Lock couplers 70, 72 are disconnected and the winches 16 are operated to pay out guy line cables 14 which are secured to suitable, fixed anchor points (as in FIG. 1). The winches 16 are then reverse-operated to tension the cable sufficiently to support and stabilize the top of the tower against the physics of the yarding operation involved in the skyline 18, which is similarly extended and secured to its distant anchor point in the generally-opposite direction. As previously explained, after a load of trees or logs has been yarded (or skidded) to and dropped at the unloading site adjacent the vehicle 10, the load is released from its connection to the log carriage 22 and the operator of the vehicle activates main line winch 20 to return the log carriage back to its loading site and the eventual delivery of subsequent loads as the time consuming is repeated.

During the lengthy periods of time between the dropping of loads adjacent the vehicle, the attention required of the operator of a typical yarder is virtually negligible, normally being limited only to the periodic starting and stopping of the carriage's movement when he is signaled to do so as by radio or other form of communication from remote personnel. It is clear therefore that the operator in this unique invention may devote virtually all but the most periodic and incidental of his otherwise wasted, but skilled time and attention to the operation of the handling, processing, sorting and even final loading of merchantable logs for transport while the yarding apparatus is operating typically to deliver freshly cut loads of trees to the work site.

In this regard, once a freshly cut load of yarded trees has been dropped adjacent the vehicle, the operator activates the winch 20 to return the log carriage to its loading site and then proceeds to operate the various controls to position the vehicle on its turntable 36 and the boom arm 52 and processor head-orienting adjustment mounts 66, 68 to position the processor head for engaging and picking up a yarded tree, whereupon the processor head is activated to perform its normal operation of de-limbing, sizing, and other conventional processing functions. The appropriate controls then are again operated to take the processed log and place it into a selected position within the peripheral reach of the boom arm and processor head assembly about the vehicle 10, as for example, in various, desired sorting stacks or directly onto log trucks positioned adjacent the vehicle for road transport, without need of any additional handling and related expense and costs of other dedicated heavy equipment and skilled heavy equipment operators normally involved. The foregoing processing/placing process is continuously repeated while the yarding process is operating continuously, interrupted only by the operator's activation of the winch 20 in one direction or the other as signaled by a worker at the relevant loading or unloading location. Alternatively of course, a radio-controlled, powered log carriage 22 may instead be provided, as is a known yarder carriage alternative in the art.

From the foregoing, it will be apparent to those skilled in the art that various changes, other than those already described and suggested, may be made in the method steps and in the size, shape, type, number and arrangement of parts of the vehicle described hereinbefore without departing from the spirit of this invention and the scope of the appended claims. For example, although a framework-type tower assembly is illustrated herein for simplicity and clarity, other tower constructions and configurations suitable for the purpose are also contemplated herein including, but not limited to, tubular, extensible towers and others which may be found suitable and desirable, limited only in the common requirement that the tower assembly must be configured to provide for relative rotation between the top cable guide head (and its equivalent) and its mount on the supporting, rotatable vehicle therebelow at some intermediate point, and preferably that a reasonably substantially common axis of rotation is shared between the vehicle's rotation on its supporting undercarriage and the guide head assembly when fixed in an operative condition by the cables of the yarder assembly. Also, although a track-mounted vehicle is illustrated herein, other types of ground-engaging motive means may, if desired and suitable instead be used, including, but not limited to, steerable, tired wheels, etc. Further, additional steps in the method of this invention, as well as steps in alternate sequence of those steps described, may be performed without departing from the spirit of this invention and the scope of the appended claims.

Having now described my invention and the manner in which it may be used, I claim:

1. A method of logging whereby the yarding of felled trees, the processing of yarded trees into processed logs, and the disposition of processed logs is conducted by a single personnel at a logging site, the method comprising:

a) providing to a logging destination site a self-maneuverable, turntable-type, single operator vehicle having an articulated, hydraulically-operated boom arm assembly mounting at its outer terminal end a controllably-articulated processor head assembly, said vehicle also mounting a yarder tower assembly having a yarder guide head assembly rotatably mounted on the tower assembly for rotation about the same axis of rotation of said vehicle turntable, and controls for operation of the vehicle are provided for operation by a single operator, whereby, with all yarder cables operatively extended from the guide head assembly, the vehicle is operatively fully rotatable therebeneath on its turntable, b) operating the vehicle to yard a load of felled trees to said destination site including dropping said load and operating the vehicle to repeatedly yard and drop a next, and subsequent loads of felled trees to the destination site, and c) concurrently with and during said next and subsequent yarding operations, operating said vehicle turntable, boom arm assembly and processor head apparatus to engage and process each individual yarded tree into a processed log at the destination site, lift, carry and deposit each said processed log to a selected destination within the operative reach of the boom arm assembly and processor head assembly about the entire periphery of the vehicle including into temporary log sorting stacks and onto log transport vehicles as selected by the operator of said vehicle.

2. The method of claim 1 including the step, subsequent to the completion of a logging operation, of operating the boom arm assembly to engage and releasably lock with the yarder tower assembly and operate the boom arm assembly to move the tower assembly into a lowered, storage and transport condition on the vehicle for movement of the vehicle about a logging site and onto a trailer for road transport of the vehicle between jobs.

* * * * *